US 12,118,791 B2

(12) United States Patent
Polinski et al.

(10) Patent No.: US 12,118,791 B2
(45) Date of Patent: Oct. 15, 2024

(54) ACTIVE SHOOTER RESPONSE SYSTEMS AND METHODS

(71) Applicant: 3D Response Systems LLC, Brooklyn Park, MN (US)

(72) Inventors: Jason Polinski, Lakevile, MN (US); Peter Matos, Lakeville, MN (US)

(73) Assignee: 3D Response Systems LLC, Brooklyn Park, MN (US)

( * ) Notice: Subject to any disclaimer, the term of this patent is extended or adjusted under 35 U.S.C. 154(b) by 715 days.

(21) Appl. No.: 17/188,431

(22) Filed: Mar. 1, 2021

(65) Prior Publication Data

US 2021/0271894 A1     Sep. 2, 2021

Related U.S. Application Data

(60) Provisional application No. 62/982,274, filed on Feb. 27, 2020.

(51) Int. Cl.
*G06V 20/52*  (2022.01)
*B05B 1/02*   (2006.01)
*G07C 9/00*   (2020.01)
*H04L 67/12*  (2022.01)

(52) U.S. Cl.
CPC ............... *G06V 20/52* (2022.01); *B05B 1/02* (2013.01); *G07C 9/00309* (2013.01); *H04L 67/12* (2013.01)

(58) Field of Classification Search
None
See application file for complete search history.

(56) References Cited

U.S. PATENT DOCUMENTS

| 9,354,619 | B2 | 5/2016 | Ergenbright et al. |
| 9,905,117 | B2 | 2/2018 | Estes et al. |
| 9,976,306 | B1 | 5/2018 | Horner |
| 2015/0170486 | A1* | 6/2015 | Penland ............... G07C 9/30 348/152 |
| 2016/0171876 | A1* | 6/2016 | Lyman ............... G08B 25/001 340/287 |
| 2016/0358393 | A1* | 12/2016 | Penland ........... G08B 13/19652 |
| 2017/0140622 | A1* | 5/2017 | Lyman ..................... G08B 5/38 |
| 2017/0140638 | A1* | 5/2017 | Lyman ................ G08B 19/005 |
| 2019/0080577 | A1 | 3/2019 | Raz et al. |
| 2019/0360782 | A1 | 11/2019 | Blackburn |
| 2020/0168068 | A1* | 5/2020 | Lyman ..................... G08B 7/06 |
| 2023/0290200 | A1* | 9/2023 | Tan .................... G07C 9/00563 |

FOREIGN PATENT DOCUMENTS

BE         902556     * 5/1985    ............. G08B 15/02

OTHER PUBLICATIONS

BE902556 English machine translation (Year: 1985).*

* cited by examiner

*Primary Examiner* — Nancy Bitar
(74) *Attorney, Agent, or Firm* — Dicke, Billig & Czaja, PLLC

(57) ABSTRACT

Security systems and methods for a building upon occurrence of a possible event impacting safety of occupants of the building, such as a possible active shooter event.

11 Claims, 7 Drawing Sheets

ACTIVE SHOOTER RESPONSE SYSTEMS AND METHODS

CROSS-REFERENCE TO RELATED APPLICATIONS

This application claims the benefit of U.S. Provisional Patent Application Ser. No. 62/982,274, filed Feb. 27, 2020, the entire teachings of which are incorporated herein by reference.

BACKGROUND

The present disclosure is directed to building security systems and methods. More particularly, it relates to systems and methods that prepare for and respond to a possible active shooter event at an occupied building, such as a school.

Active shooter incidents at schools (and at other buildings with high occupancy) can and do happen. It is a highly unfortunate reality of today's society. In many building scenarios, a guard or other authority person may monitor a front entrance as a primary line of defense, and that person's main (or only) responsibility when recognizing a possible active shooter situation is to alert an appropriate first responder organization (e.g., local law enforcement). First responders can be highly trained for handling active shooters, but oftentimes do not have sufficient information in hand for responding to a particular event. Moreover, even if the first responders can be on-site in a matter of minutes, the majority of violence occurs in the first five minutes of an active shooter event. Occupants of the building might be alerted to the presence of a possible active shooter via public address speakers in the building, but the building itself does not provide other mechanisms for preventing the active shooter from entering the building and/or limiting the active shooter's movements.

With the increasing prevalence of active shooter events, some efforts have been made to implement additional security measures at schools, office buildings, and the like. For example, many schools now have a metal detector at the front entrance. Other suggestions for addressing active shooter threats include eliminating most ingress/egress sites, bullet proof glass, classroom door barriers, hand held ballistic shields, training (run, hide, fight training organizations), and even the possibility of arming teachers (or other building occupants). While laudable, these suggestions cannot, in and of themselves, provide a sufficient level of security. Further, each individual building and its likely occupants can be vary dramatically, making it virtually impossible to have a "one size fits all" solution.

Any improvements to active shooter security systems and methods will be well-received.

SUMMARY

The inventors of the present disclosure have recognized a need to address one or more of the above-mentioned problems.

DETAILED DESCRIPTION

Some aspects of the present disclosure provide systems and methods for addressing possible active shooter events at a school or other building of high occupancy. In some embodiments, a comprehensive system is provided. Information, tools, and tactics are designed for prevention, the act of, and the aftermath of an active shooter event (or other form of building violence).

Preventative aspects can include training that covers one or more of mental health, building relationships, stakeholders, how to respond to threats of violence, how to respond to an actual act of violence, policy language for threats. Consultation can also be provided for any active threat that may come to an institution (e.g., to better prevent an incident from occurring).

Security systems of the present disclosure that are installed or otherwise associate with a building of interest that serve to address an actual act of violence can be a multi-layered system that is designed to dovetail with both the occupants of the building via a "hardening" of the building, and the response of the first responders. In some embodiments, the security systems of the present disclosure can be designed to assist those involved to survive the initial threat, get first responders on the scene as quickly as possible, and minimize the loss of life and injury. The layers can include, in some embodiments, one or more of ballistic protections, enhanced door security systems, remote communication systems, internal and/or external alerts (e.g., one or both of audio and visual), a suspect identification system via colored powder spray or the like, shatter-resistant window protection, multi and individual room door entrance fobs, entry point buzz-in systems, dispatching center inside the building, live video feeds, immediate police notification systems (e.g., fixed and/or remote/worn police push buttons with instant multi-functional information sharing), etc.

Aftermath-related aspects of the present disclosure can include consultation following an active shooter event.

As implicated by the above, in some embodiments, the systems and methods of the present disclosure can be viewed as comprehensive. All pieces (physical components and training) can work in concert to minimize risk and injury.

Figure 1:
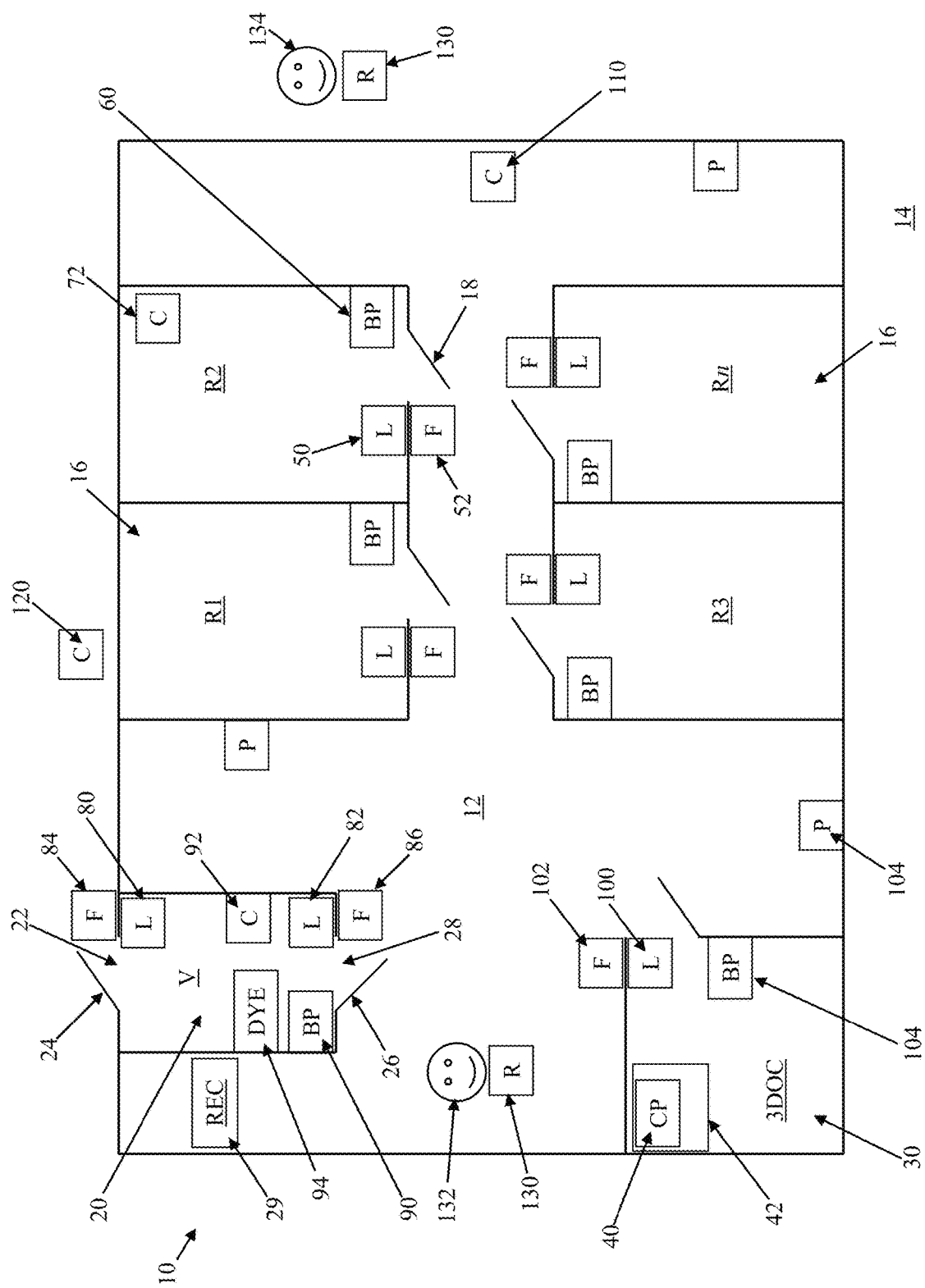
FIG. 1 schematically illustrates a security system in accordance with principles of the present disclosure installed to a building.

With the above in mind, some features of the security systems of the present disclosure are shown in FIG. 1 as installed to a building 10. It will be understood that the building 10 is a simplified representation, and the systems and methods of the present disclosure are equally useful with a plethora of other building lay-outs or designs. In general terms, outer walls of the building 10 establish a building interior 12 that is enclosed relative to an outdoor or outside environment 14. Within the building interior 12, a number of rooms 16 are defined by interior walls or partitions (e.g., rooms labeled R1-Rn in FIG. 1). The building 10 can have any number of the rooms 16, and each individual room can have a unique footprint. Further, the building 10 can have two or more levels or floors, with each floor having one or more rooms 16. Regardless, each of the rooms 16 typically has or defines a doorway through which persons enter and leave the room, along with a door that can open or close the doorway (e.g., a door 18 labeled for the room R2). The building interior 12 can further define various other features, such as hallways, large open areas, etc.

In some embodiments, the systems of the present disclosure include construction of a vestibule ("V") 20 at a main or primary entrance 22 of the building 10. The vestibule 20 is a wall-partitioned space that provides an exterior door 24 at the main entrance 22 and an interior door 26 at an interior entrance 28. Persons wishing to enter the building interior 12 must first pass through the main entrance 22 (e.g., the exterior door 24 must be opened), and then pass through the interior entrance 28 (e.g., the interior door 26 must be opened). It will be recognized that many buildings are designed with vestibules akin to the descriptions above; under those circumstances, the systems and methods of the present disclosure may not require construction of a "new" vestibule. Regardless, in some embodiments, a receptionist station or desk ("REC") 29 can be provided near (but outside of) the vestibule 20 and at which an attendant can control access to the entrances 22, 28.

In some embodiments, the systems of the present disclosure include construction of an operations center 30 (optionally referred to as the 3D Operations Center or "3DOC") within the building interior 12. The operations center or 3DOC 30 is a walled area or room of the building 10 designated for authorized person(s) (e.g., administrators authorized to operate or prompt operation of various system features as described below) in a covered and/or concealed manner. In some embodiments, the operations center 30 can be an existing room of the building 10; in other embodiments, the systems and methods of the present disclosure can include constructing the operations center 30 as a standalone room or structure. Further, while FIG. 1 illustrates the system as including a single 3DOC 30, in other embodiments, two or more operations centers can be constructed or designated within the building 10

As described in greater detail below, in some embodiments, the systems and methods of the present disclosure provide electronically activated/deactivated features. These (and other) features are electronically connected (e.g., wired connection or wireless connection) to a control panel ("CP") 40 located in the 3DOC 30. The control panel 40 is provided as part of an operations center computer or computer-like device 42 having a processor, memory, etc., as is known in art. A user utilizes the control panel 40 to perform various actions as described in greater detail below (e.g., the control panel 40 can be or can include a touch screen, manual actuator mechanisms, etc.). In some embodiments, the computer or computer-like device connected to the control panel 40 is programmed (e.g., software or hardware) to perform various steps or algorithms when informed of the occurrence of an active shooter event (or other emergency-type event) as described below. The various electronic features or components described below can be wired to the control panel 40, and the wiring can be supervised for any opens, grounds, or shorts to provide additional reliability. The control panel 40 is generally configured or formatted (e.g., the 3DOC computer 42 is programed to prompt displays at the control panel 40) to display detailed information of each device on the network (i.e., installed to the building 10) if activated, or in any of the fault conditions mentioned elsewhere. In some embodiments, a graphic computer station can be installed that will have the building floor plan on the control panel 40 and provide status condition of any connected device.

Figure 2:
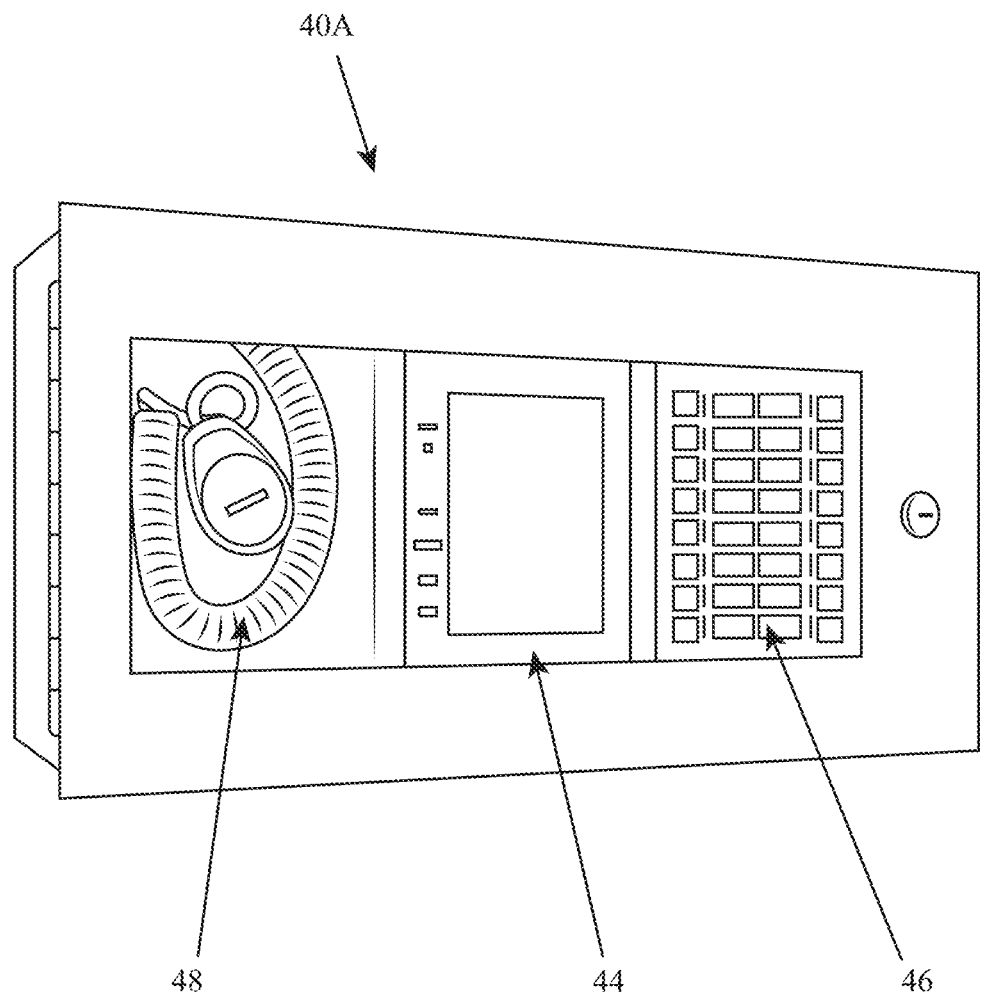
FIG. 2 is a front view of a control panel useful with the security system of FIG. 1.

One non-limiting example of a 3DOC control panel 40A is shown in FIG. 2. The control panel 40A can include one or more of a display screen 44, a switch module 46, and an intercom microphone 48. The display screen 44 can be an electronic display of a type known in the art, and can be prompted by the computer (not shown) to display information of interest. In some embodiments, the display screen 44 can be or include a touch screen for receiving user input. The switch module 46 provides a plurality of programmable switches or buttons that are used to automatically initiate a predetermined or preprogrammed control operation (e.g., different automated voice commands for weather alert, medical alert, soft lockdown, etc.). In some examples, the switch module 46 can be an electronic switch module available under the trade designation "Gamewell-FCI, ASM-16 Addressable Switch Module" available from Honeywell International Inc. The intercom microphone 48 can be connected to all speakers (not shown) installed throughout the building 10 (FIG. 1) and provides a means to manually broadcast information. The control panel 40A can optionally be maintained within a lockable case as shown.

Returning to FIG. 1, in some embodiments, the systems and methods of the present disclosure include the installation of one or more features to one or more (including all) of the rooms 16. For example, a lock ("L") 50 (labeled for the second room R2) can be installed to the door of the room 16. In some embodiments, the lock 50 is, or is part of, a magnetic door locking system, for example a magnetic door locking system having two points of contact containing a combined pressure on the order of 2400 psi in some non-limiting embodiments. Other lock formats can be employed in other embodiments. With the non-limiting examples in which the lock 50 is, or is part of, a magnetic door locking system, one or more release mechanism or devices can further be provided. For example, a key fob ("F") 52 (labeled for the second room R2) of a type known to those of ordinary skill can be installed to an exterior of the room 16 in question, electronically linked to the lock 50 such that when a person having an authorized code and/or access card or the like interacts with the key fob 52, the lock 50 automatically unlocks (e.g., causes the magnetic door locking system to automatically release pressure). The access card can be carried by authorized occupants of the building 10. Alternatively or in addition, an exit button, switch, etc. (not shown) can be installed at an interior of the room 16 in question, and configured to prompt the lock 50 to unlock when pressed or otherwise actuated. Alternatively or in addition, a crash bar or the like can be installed to the door in question, configured to prompt the lock 50 to unlock when pressed or otherwise actuated. Alternatively or in addition, the lock 50 can be electronically linked to the control panel 40 in the 3DOC 30 (or more particularly, the 3DOC computer or computer-like device 42 that operates the control panel 40); where so provided, a user in the 3DOC 30 can operate the control panel 40 to prompt the lock 50 to unlock.

Ballistic panels ("BP") 60 can be installed at one or more (including all) of the rooms 16 (labeled for the second room R2). The ballistic panels 60 can be of a type known in the art and configured to withstand the impact of a projectile fired from a firearm. The ballistic panel(s) 60 are strategically placed along the room(s) 16 based upon building design and structure combined with staff-trained response and first responder response to best create a safe area to shield from threat within the building 10. Where provided, the ballistic panel(s) 60 can be permanently installed, and a location of panel placement can be determined based upon the layout of the interior of the building.

Figure 3A:
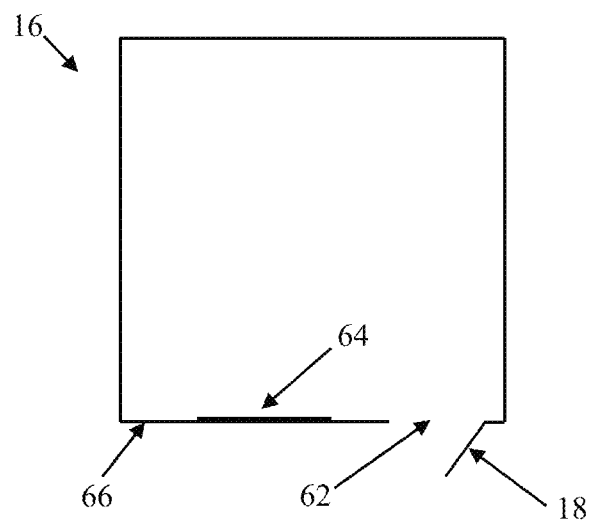
FIG. 3A schematically illustrates an embodiment of a threshold protection device installed to a room and in a normal arrangement.

In some embodiments, ballistic panels can be installed to one or more of the rooms 16 in a format configured to provide threshold protection or cover at the room's door. For example, FIG. 3A illustrates an example room 16 with a door 18. An entryway or threshold 62 is in a wall of the room 16 through which the room 16 can be accessed when the door 18 is open. A threshold protection device 64 is installed to the room 16 in some embodiments of the present disclosure. The threshold protection device 64 can assume various forms, and can be secured to a wall (or other area) of the room in various fashions. In one non-limiting example, the threshold protection device 64 is, or is akin to, a door formed of ballistic panel(s) or the like, having a height of at least 3 feet in some embodiments, at least 5 feet in other embodiments, at least 6 feet in yet other embodiments, or approximating an available height of the room 16 in yet other embodiments. With the non-limiting example of FIG. 3A, the threshold protection device 64 is secured to a wall 66 (or other structure in close proximity to the wall 66) by one or more hinges. While the threshold protection device 64 is shown as being installed relatively close to the entryway 62, other locations are also acceptable. In the normal arrangement of the threshold protection device 64 reflected by FIG. 3A, the threshold protection device 64 is relatively hidden and does not overtly obstruct access to the room 16, and is non-intrusive/does not serve as a noticeable distraction to occupants of the room 16.

Figure 3B:
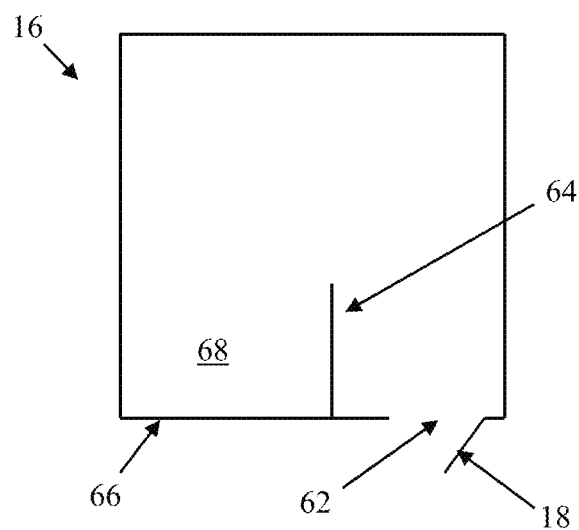
FIG. 3B illustrates the threshold protection device of FIG. 3A in a protection arrangement.

In response to an active shooter or other event, the threshold protection device 64 can be articulated (e.g., pivoted) to the protection arrangement of FIG. 3B. In the protection arrangement, the threshold protection device 64 and the wall 66 combine to form a "safe zone" 68 (akin to an L-shaped area) within which occupants of the room 16 can take cover. The threshold protection device 64 (in the protection arrangement) protects occupants of the room 16 from a person (e.g., shooter) located outside the room 16 (e.g., in the hallway). The threshold protection device 64 is configured and arranged to allow occupants of the room 16 (e.g., students) to huddle or hunker down in the safe zone 68 area within the L where a shooter at the door 18 can neither see or shoot through the ballistic protective area where occupants of the room 16 are taking cover.

Figure 4A:
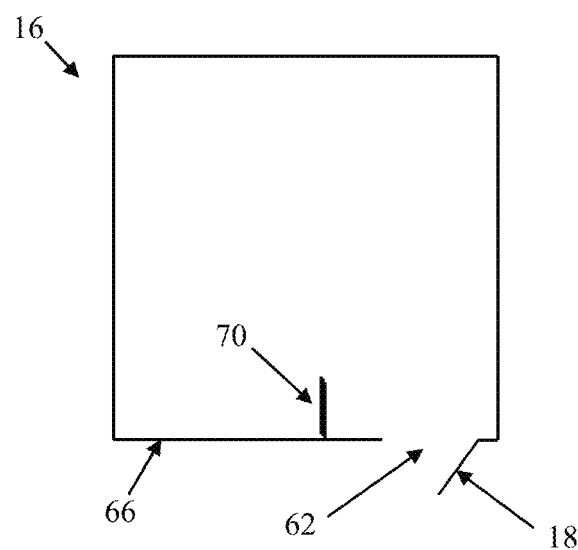
FIG. 4A schematically illustrates another embodiment of a threshold protection device installed to a room and in a normal arrangement.

The threshold protection devices of the present disclosure can assume other forms differing from the swinging hinged panel door of FIGS. 3A and 3B. For example, the threshold protection device can be akin to and installed as a pocket door (formed of ballistic panel(s)). Alternatively or in addition, FIG. 4A illustrate another example of a threshold protection device 70 of the present disclosure (in a normal arrangement), formatted as an expandable, sliding door. The segments of the sliding door 70 are slidably connected to one another, and are formed of ballistic panel(s). With the non-limiting example of FIG. 4A, the threshold protection device 70 is mounted or secured to the wall 66 (or other structure in close proximity to the wall 66) in various fashions. While the threshold protection device 70 is shown as being installed relatively close to the entryway 62, other locations are also acceptable. In the normal arrangement of the threshold protection device 70 reflected by FIG. 4A, the threshold protection device 70 does not overtly obstruct access to the room 16, and is non-intrusive/does not serve as a noticeable distraction to occupants of the room 16.

Figure 4B:
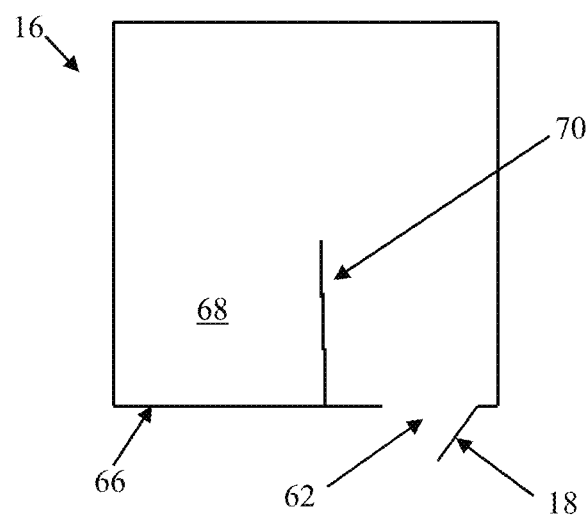
FIG. 4B illustrates the threshold protection device of FIG. 4A in a protection arrangement.

In response to an active shooter or other event, the threshold protection device 70 can be articulated (e.g., expanded) to the protection arrangement of FIG. 4B. In the protection arrangement, the threshold protection device 70 and the wall 66 combine to form the "safe zone" 68 (akin to an L-shaped area) within which occupants of the room 16 can take cover. The threshold protection device 70 (in the protection arrangement) protects occupants of the room 16 from a person (e.g., shooter) located outside the room 16 (e.g., in the hallway) as described above.

Returning to FIG. 1, a camera ("C") 72 can be installed at one or more (including all) of the rooms 16 (labeled for the second room R2). The camera 72 can be of a type known in the art, and can be electronically linked to the 3DOC computer 42. In general terms, the camera 72 is configured to provide a live stream feed to the 3DOC computer 42 of events occurring within a field of view of the camera 72. The camera 72 can be operated in an "always on" state (either 24 hours/day, or at designated times during the day), and/or can be operational only when prompted by a user in the 3DOC 30 (via the control panel 40).

With some systems and methods of the present disclosure, one or more security features are installed at or to the vestibule 20. For example, a lock ("L") 80 can be installed to lock the exterior door 24 when closed, and a lock ("L") 82 can be installed to lock the interior door 26 when closed. In some embodiments, the locks 80, 82 can be identical, or nearly identical, to the locks 50 described above (e.g., a magnetic door locking system). With these and related embodiments, an exterior key fob ("F") 84 can be installed for prompting the exterior door lock 80 to unlock, and an interior key fob ("F") 86 can be installed for prompting the interior door lock 82 to unlock. Alternatively or in addition, other devices or mechanisms can be provided for unlocking one or both the locks 80, 82 (e.g., in some embodiments, the war room computer 42 is programmed to allow a user to unlock one or both of the locks 80, 82 via interfacing with the control panel 40 while stationed in the 3DOC 30).

Ballistic panels ("BP") 90 can be installed at or along walls of the vestibule 20 in some embodiments. The ballistic panels 90 can be similar or identical to the ballistic panels 60 described above.

A camera ("C") 92 can be installed at the vestibule 20. The camera 92 can be of a type known in the art, and can be electronically linked to the 3DOC computer 42. In general terms, the camera 92 is configured to provide a live stream feed to the 3DOC computer 42 of events occurring within a field of view of the camera 92. The camera 92 can be operated in an "always on" state (either 24 hours/day, or at designated times during the day), and/or can be operational only when prompted by a user in the 3DOC 30 (via the control panel 40).

A dye spray device or system ("DYE") 94 can be installed at the vestibule 20. In some embodiments, the dye spray system 94 includes supply (e.g., metal container) of dye (e.g., a non-toxic, bright colored powder such as colored baking powder or the like) fluidly connected to one or more nozzles. The dye and nozzle(s) can be located at various places along the vestibule 20, and in some embodiments are installed at a ceiling of the vestibule 20. In some embodiments, two (or more) of the dye spray nozzles can be installed to the vestibule 20 (e.g., one nozzle per 20 square feet). Regardless, the dye spray nozzle(s) is positioned so as to direct dye or spray powder from the supply at a location of the vestibule 20 where an intended target is likely to be located. In some embodiments, the dye spray nozzle(s) is arranged so as to correspond to a field of view of the camera 92. In some embodiments, the dye spray system 94 can further include a pressurized canister, pump or other mechanism configured to force dye or spray powder from the supply to the nozzle(s). For example, the dye powder can be contained in a pressurized canister (e.g., 5 gallon canister under pressure of 300 psi); an outlet valve on the canister can be controlled by an electric solenoid. With these and related embodiments, the pump or other control mechanism can be electronically linked to the 3DOC computer 42. With this construction, the 3DOC computer 42 can be configured to permit a user to actuate release of the spray powder from the container (e.g., open the outlet valve) while stationed in the 3DOC 30 (via the control panel 40) as described in greater detail below.

With some systems and methods of the present disclosure, one or more security features are installed at or to the 3DOC 30. For example, a lock ("L") 100 can be installed to lock the door of the 3DOC 30 when closed. In some embodiments, the lock 100 can be identical, or nearly identical, to the locks 50 described above (e.g., a magnetic door locking system). With these and related embodiments, a key fob ("F") 102 can be installed for prompting the 3DOC lock 100 to unlock as described above with respect to the key fob 52. Alternatively or in addition, other devices or mechanisms can be provided for unlocking the 3DOC lock 100 (e.g., in some embodiments, the 3DOC computer 42 is programmed to allow a user to unlock the 3DOC lock 100 via interfacing with the control panel 40 while stationed in the 3DOC 30).

Ballistic panels ("BP") 104 can be installed at or along walls of the 3DOC 30 in some embodiments. The ballistic panels 104 can be similar or identical to the ballistic panels 60 described above.

Figure 5:
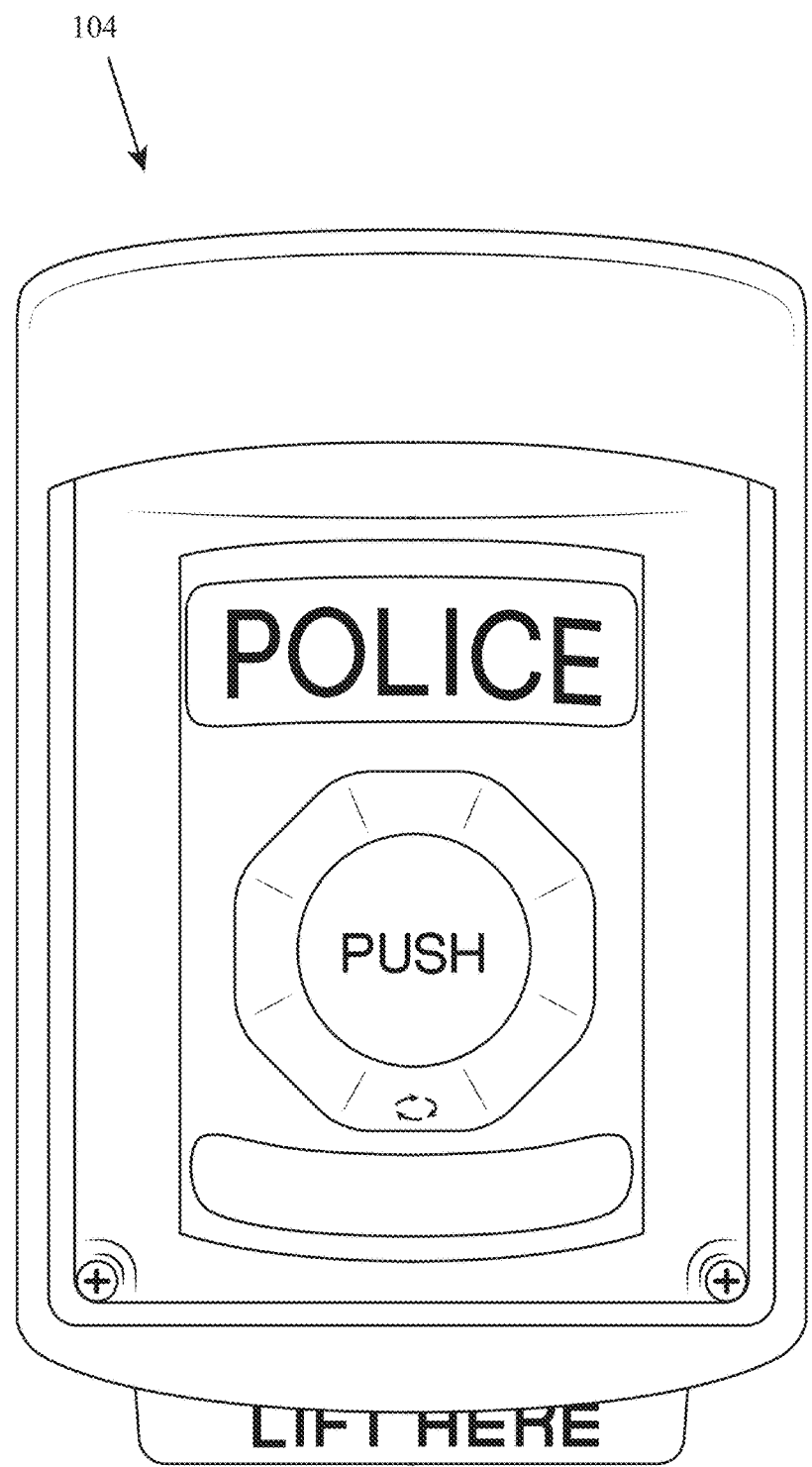
FIG. 5 is a front view of an alert button useful with the security system of FIG. 1.

Additional security measures are optionally provided with the systems and methods of the present disclosure. For example, one or more fixed alert stations (or Police Alert Station) ("P") 104 can be located throughout the building interior 12, each electronically linked to the 3DOC computer 42. The 3DOC computer 42 can be programmed to initiate an emergency routine when notified of an "access" or "emergency" event at the so-designated Police Alert Station 104. The Police Alert Stations 104 can each have or provide a button or similar actuator, and each have dedicated electronic connection/wiring to the control panel 40 (e.g., each alert button is connected to the control panel 40 with an individual address); these alert buttons can be labeled in a manner giving a clear indication that an emergency response will be initiated when activated (e.g., a button labeled with "POLICE" or the like). One non-limiting example of a Police Alert Station 104 is shown in FIG. 5.

Returning to FIG. 1, one or more interior cameras ("C") 110 can be installed at various locations throughout the building interior 12. The camera(s) 110 can be of a type known in the art and can be electronically linked to the 3DOC computer 42. In general terms, the camera 110 is configured to provide a live stream feed to the 3DOC computer 42 of events occurring within a field of view of the camera 110. The camera 110 can be operated in an "always on" state (either 24 hours/day, or at designated times during the day), and/or can be operational only when prompted by a user in the 3DOC 30 (via the control panel 40).

Alternatively or in addition, one or more exterior cameras ("C") 120 can be installed at various locations at the building exterior 14 (e.g., in close proximity to the main entrance 22). The camera(s) 120 can be of a type known in the art, and can be electronically linked to the 3DOC computer 42. In general terms, the camera 120 is configured to provide a live stream feed to the 3DOC computer 42 of events occurring within a field of view of the camera 120. The camera 120 can be operated in an "always on" state (either 24 hours/day, or at designated times during the day), and/or can be operational only when prompted by a user in the 3DOC 30 (via the control panel 40).

Alternatively or in addition, a mobile or remote alert device ("R") 130 can be provided to one or more authorized persons. The remote alert device 130 can be akin to a panic alert button that is worn or carried by a user (e.g., on a lanyard around the user's neck). The remote alert device 130 is electronically connected to the 3DOC computer 42. The 3DOC computer 42 is programmed such that upon receiving an alert signal from one of the remote alert devices 130, and an emergency routine is initiated. As reflected by FIG. 1, the remote alert device 130 can be carried by a person 132 located at the building interior 12 and/or by a person 134 located at the building exterior 14.

As mentioned above, the 3DOC computer 42 is programmed to execute one or more emergency routines upon receiving a signal from an alert device (e.g., one or more of the Police Alert Stations 104; one or more of the remote alert devices 130; a user located in the 3DOC 30 actuated a dedicated button or the like on or near the control panel 40). Once initiated, various actions can be performed or undertaken by an authorized user in the 3DOC 30 via the control panel 40. In some non-limiting embodiments, the 3DOC computer 42 is programmed to provide a user at the control panel 40 the ability to select from two or more pre-determined emergency response options. For example, the systems and methods of the present disclosure can provide for multiple different messages that require different responses (e.g., the switch module 46 of FIG. 2). In some non-limiting embodiments, the multiple messages can be selected from: active shooter event; soft lockdown medical-staff is to keep occupants of the building 10 in their room 16 (e.g., kids in the their class room where the building 10 is a school) while first responders attend to an injury; soft lockdown disorderly-a situation has arose that is not active shooter, but requires people to stay in their rooms until cleared; evacuation-due to a situation where it becomes a threat inside the building and immediate evacuation is necessary (e.g., chemical spill, air pollutant, etc.); weather alert-notify those inside the building 10 of serious approaching weather conditions; all clear-return to normal routines.

Figure 6:
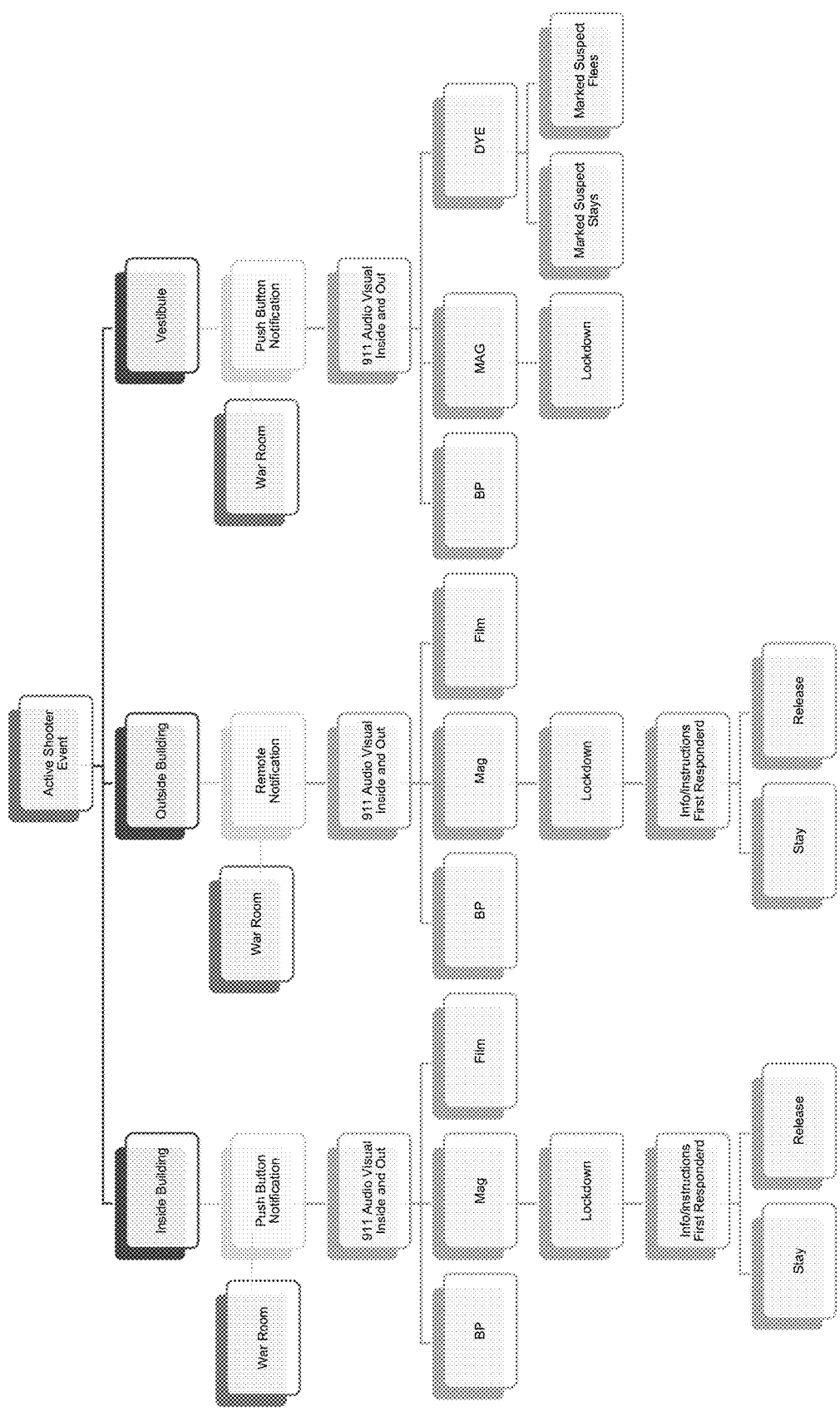
FIG. 6 is a flow chart illustrating methods in accordance with principles of the present disclosure.

With additional reference to FIG. 6, some methods of the present disclosure can include a systematic response to an active shooter event. Upon receiving an alert as described above, the 3DOC computer 42 operates (either automatically or upon prompting by as user at the control panel 40) to perform active shooter event routines or steps. The steps can vary depending upon location (e.g., FIG. 6 implicates that different steps can be taken relative to the building interior 12, the building exterior 14, and the vestibule 30, and that an active shooter alert can come from any area). Warnings are prompted by the 3DOC computer 42, for example flashing lights both internally and externally are activated; an audio alert (e.g., voice messages, tones, or both) are broadcast internally and externally. Live time communication is established by the 3DOC computer 42 with a designated first responder organization (e.g., a voice over internet call is made to 911). For each of the rooms 16, the door locks 50 are automatically prompted to close and lock the corresponding door for each of the rooms 16 and a live feed from the camera 70 (where provided) is delivered to the 3DOC computer 42. The ballistic panels 60, having been strategically placed, then come into play to provide protection to the building occupants. These actions effectuate a "lock down" of each of the rooms 16. Similar steps are automatically taken outside the building 10 and at the vestibule 20. In some embodiments, the active shooter event methods of the present disclosure can include the control panel 40 being prompted to give an occupant in the 3DOC 30 the opportunity to activate the dye spray system 94 (e.g., viewing a live feed from the vestibule 20, the user in the 3DOC 30 can visually see an intruder in the vestibule 20). In some embodiments, the systems and methods of the present disclosure can include a user first confirming, at the control panel 40 or elsewhere, that an active shooter event (or perhaps other emergency event) is in progress; only then will a "dye spray" actuator/button be made available or active to the user at or near the control panel 40. The systems and methods of the present disclosure can include the dye spray system becoming active only after an emergency response event has been implicated (e.g..., a button labeled "DYE" or the like will be active only after a dedicated alert button (e.g., the Police Alert Station 104) has been actuated). These optional embodiments can prevent accidental deployment of the spray powder or dye. Regardless, once activated, the dye spray system 94 will dispense the dye, hopefully covering the intruder. The user can note success of the dye spraying operation. In some embodiments, a dye spray button or the like can be provided in the 3DOC 30 and at the receptionist station 29.

First responders are given direct access to all the information being collected at the 3DOC computer 40 (including, for example, a location in the building 10 from which the initial alert signal was generated). In some embodiments, first responders can gain access to any locked door via an access card located in a lock box on an exterior of the building 10. Upon clearing a region or entirety of the building 10, the first responders can provide information or instructions to the building occupants via the 3DOC computer 42 and/or the control panel 40, and can decide to keep the occupants in each individual room 16 secured/locked inside, or to unlock the corresponding door lock to release the occupants of the particular room 16.

In some embodiments, if the building 10 does not support adequate radio response in all areas for first responders, a Bi-Directional Amplifier (BDA) system can be installed to provide adequate radio coverage per Section 916 of the IBC 2015, IFS 2018 Section 510, NFPA 72 2010, NFPA 1221 2016, and UL2524.

Figure 7:
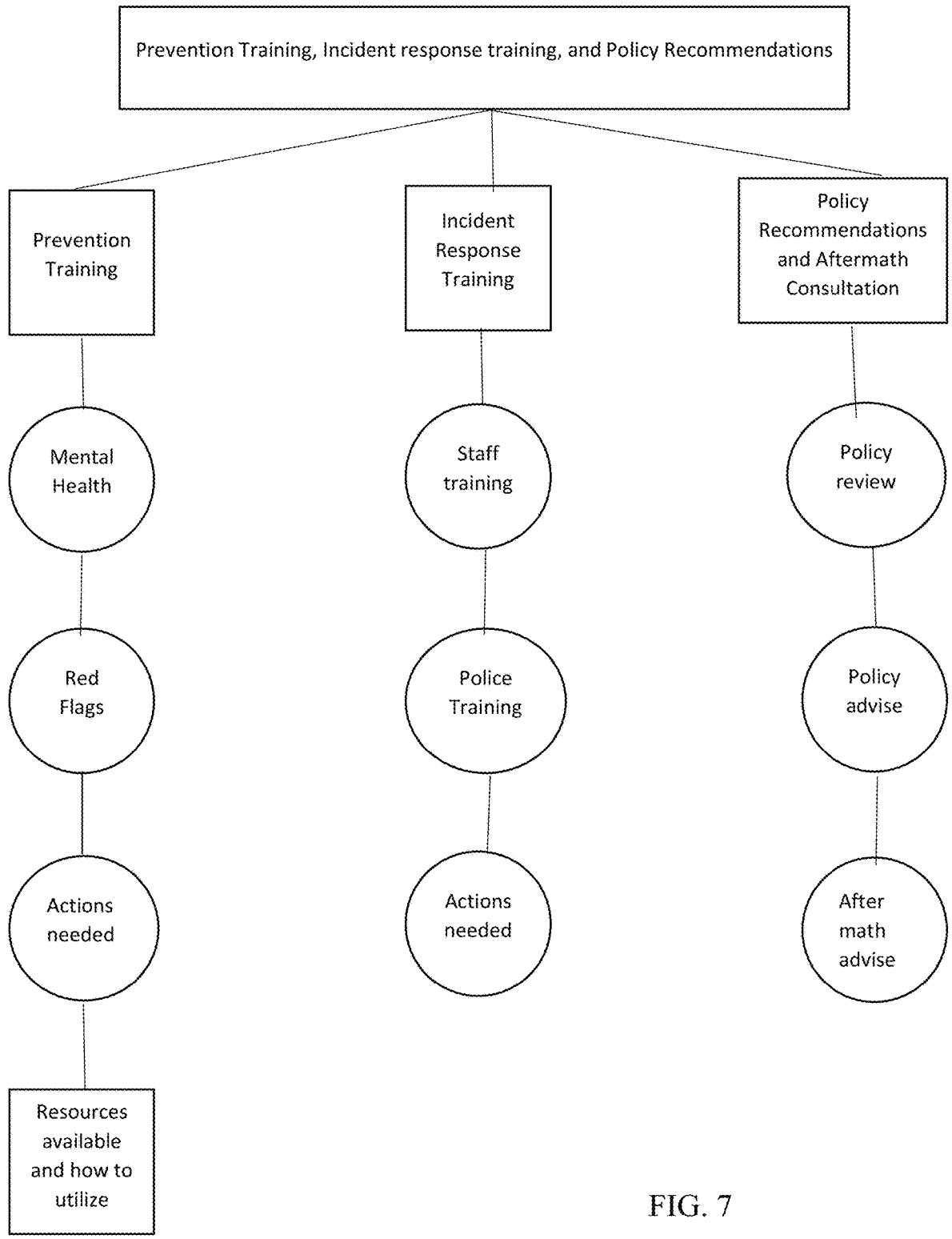
FIG. 7 is a flow chart illustrating methods in accordance with principles of the present disclosure.

As mentioned above, some methods of the present disclosure can optionally include training and/or consultation efforts with or for building occupants. These training and consulting programs can often invaluably contribute to an overall safety of all involved. With this in mind, FIG. 7 is a simplified flow chart of some of the training or consulting steps that can be taken with some embodiments of the present disclosure.

Although the present disclosure has been described with reference to preferred embodiments, workers skilled in the art will recognize that changes can be made in form and detail without departing from the spirit and scope of the present disclosure.

What is claimed is:

1. A security system for a building having a main entrance and a plurality of rooms, the security system preparing for and responding to a possible active shooter event or other form of building violence at an occupied building, the security system comprising:

a dye spray system including a dye spray device installed at a vestibule of the building, the vestibule separating the main entrance from a remainder of an interior of the building;

a plurality of dedicated alert buttons installed to an interior of the building;

a door lock installed to at least one of a plurality of rooms of the building;

a control panel installed to at least one of a plurality of rooms of the building;

wherein the control panel is electronically linked to a computer programmed to prompt displays on a display screen of the control panel, and further wherein the plurality of dedicated alert buttons and the door lock are electronically linked to the computer;

wherein the control panel further includes a switch module including a plurality of control panel buttons each corresponding to a designated event, and further wherein the computer is programmed to initiate a performance of one of a plurality of predetermined response routines in response actuation of a corresponding one of the control panel buttons or one of the plurality of dedicated alert buttons, and further wherein the computer is programmed to selectively establish a live communications link with a first responder organization, wherein the predetermine response routines include:

activate the dye spray system to allow a user to prompt dispensing of a dye at a location of the vestibule where the active shooter is likely located, automatically activate the door lock to effectuate a lock down of each of the at least one of the plurality of rooms in response to the actuation, a camera installed to the interior of the building sending a live feed to the display screen; and a threshold protection device that includes a protection arrangement with ballistic panels installed to at least one interior room of the building to form a safe zone which protects occupants of the at least one interior room.

2. The security system of claim 1, wherein the dye spray device include a nozzle, and further wherein the dye spray device is installed such that the nozzle is aimed at an interior of the vestibule.

3. The security system of claim 2, wherein the dye spray device includes a supply of dye fluidly connected to the nozzle and a control mechanism configured to release dye from the supply to the nozzle, and further wherein the dye spray system further includes an actuator electronically linked to the control mechanism for prompting operation of the control mechanism.

4. The security system of claim 3, wherein the actuator is located outside of the vestibule.

5. The security system of claim 4, wherein the actuator is electronically linked to the computer, and further wherein the computer is programmed to operate the actuator in one of:

an active state in which the actuator is permitted to signal the control mechanism to release dye from the supply when actuated by a user; and an inactive state in which the actuator is prevented from signaling the control mechanism to release dye from the supply when actuated by a user.

6. The security system of claim 5, wherein the computer is programmed to normally operate in the inactive state.

7. The security system of claim 6, wherein the computer is programmed to transition to the active state only upon the occurrence of a pre-determined event.

8. The security system of claim 1, wherein the control panel is electronically linked to the dye spray system.

9. The security system of claim 1, wherein the predetermined response routines include active shooter event, soft lockdown medical, soft lockdown disorderly, evacuation, and weather alert.

10. The security system of claim 1, wherein the door lock is a first door lock installed to a first room, the system further comprising a second door lock installed to a second room of the building and electronically linked to the computer, and further wherein the computer is programmed control operation of the first door lock independent of the second door lock.

11. The security system of claim 1, wherein the computer is programmed to record a date, time and location of the dedicated alert button in response to actuation of the dedicated alert button.

* * * * *